United States Patent
Yoshida et al.

(10) Patent No.: US 11,608,110 B2
(45) Date of Patent: Mar. 21, 2023

(54) STEERING SYSTEM

(71) Applicants: Toyota Jidosha Kabushiki Kaisha, Toyota (JP); JTEKT CORPORATION, Kariya (JP)

(72) Inventors: Takuji Yoshida, Toyota (JP); Masahide Nitano, Toyota (JP); Isao Namikawa, Okazaki (JP); Koji Anraku, Okazaki (JP)

(73) Assignees: TOYOTA JIDOSHA KABUSHIKI KAISHA, Toyota (JP); JTEKT Corporation, Kariya (JP)

( * ) Notice: Subject to any disclaimer, the term of this patent is extended or adjusted under 35 U.S.C. 154(b) by 15 days.

(21) Appl. No.: 17/469,452

(22) Filed: Sep. 8, 2021

(65) Prior Publication Data
US 2022/0081027 A1    Mar. 17, 2022

(30) Foreign Application Priority Data
Sep. 11, 2020   (JP) .............................. JP2020-152992

(51) Int. Cl.
B62D 5/04    (2006.01)
(52) U.S. Cl.
CPC ......... *B62D 5/0496* (2013.01); *B62D 5/0487* (2013.01); *B62D 5/0448* (2013.01)

(58) Field of Classification Search
CPC ... B62D 5/0496; B62D 5/0487; B62D 5/0448
See application file for complete search history.

(56) References Cited

U.S. PATENT DOCUMENTS
2019/0185052 A1    6/2019   Yoshida et al.

FOREIGN PATENT DOCUMENTS
JP    2019-104488 A    6/2019

*Primary Examiner* — Mathew Franklin Gordon
(74) *Attorney, Agent, or Firm* — Sughrue Mion, PLLC

(57) ABSTRACT

A steering system to steer wheels by a movement of a steering shaft, including: the steering shaft; an electric motor; a converter configured to convert a rotational motion of the motor into the movement of the steering shaft; a motor rotation angle obtainer configured to obtain a motor rotation angle from a zero point position; a movement-amount-related-amount obtainer configured to obtain a movement-amount-related amount that is a movement amount of the steering shaft from a neutral position or a physical amount in a one-to-one correspondence with the movement amount; and a controller including a malfunction detector configured to detect a presence or absence of a malfunction of the converter in a mode that differs depending on a temperature state of the steering system, based on the motor rotation angle from the zero point position obtained by the motor rotation angle obtainer and the movement-amount-related amount obtained by the movement-amount-related-amount obtainer.

10 Claims, 7 Drawing Sheets

STEERING SYSTEM

CROSS REFERENCE TO RELATED APPLICATION

The present application claims priority to Japanese Patent Application No. 2020-152992, which was filed on Sep. 11, 2020, the disclosure of which is herein incorporated by reference in its entirety.

BACKGROUND

Technical Field

The following disclosure relates to a steering system installed on a vehicle for steering wheels of the vehicle by a movement of a steering shaft.

Description of Related Art

Patent Document 1 (Japanese Patent Application Publication No. 2019-104488) discloses a steering system for steering wheels by a movement of a steering shaft. The steering system includes: the steering shaft; an electric motor; a converter configured to convert a rotational motion of the electric motor into the movement of the steering shaft; a rotation angle sensor configured to detect a rotation angle of the electric motor; a movement-amount detector configured to detect an amount of the movement of the steering shaft; and a malfunction detector configured to detect a malfunction of the converter. The malfunction detector detects the rotation angle of the electric motor and the movement amount of the steering shaft when the electric motor is operated. The malfunction detector detects that the converter is suffering from a malfunction when a relationship between the rotation angle of the electric motor and the movement amount of the steering shaft deviates from a predetermined relationship.

SUMMARY

An aspect of the present disclosure is directed to an improvement in a steering system, more specifically, a reduction of deterioration in the accuracy of detecting a malfunction of a converter, which deterioration arises from a temperature of the steering system.

In one aspect of the present disclosure, the malfunction of the converter is detected in consideration of a temperature state of the steering system. For instance, the malfunction of the converter may be detected in a mode that differs depending on the temperature state of the steering system. Further, the malfunction of the converter may be detected in a stable state in which the temperature state is stable. By thus detecting the malfunction of the converter in consideration of the temperature state, it is possible to reduce the deterioration in the accuracy of detecting the malfunction of the converter, which deterioration arises from the temperature of the steering system.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
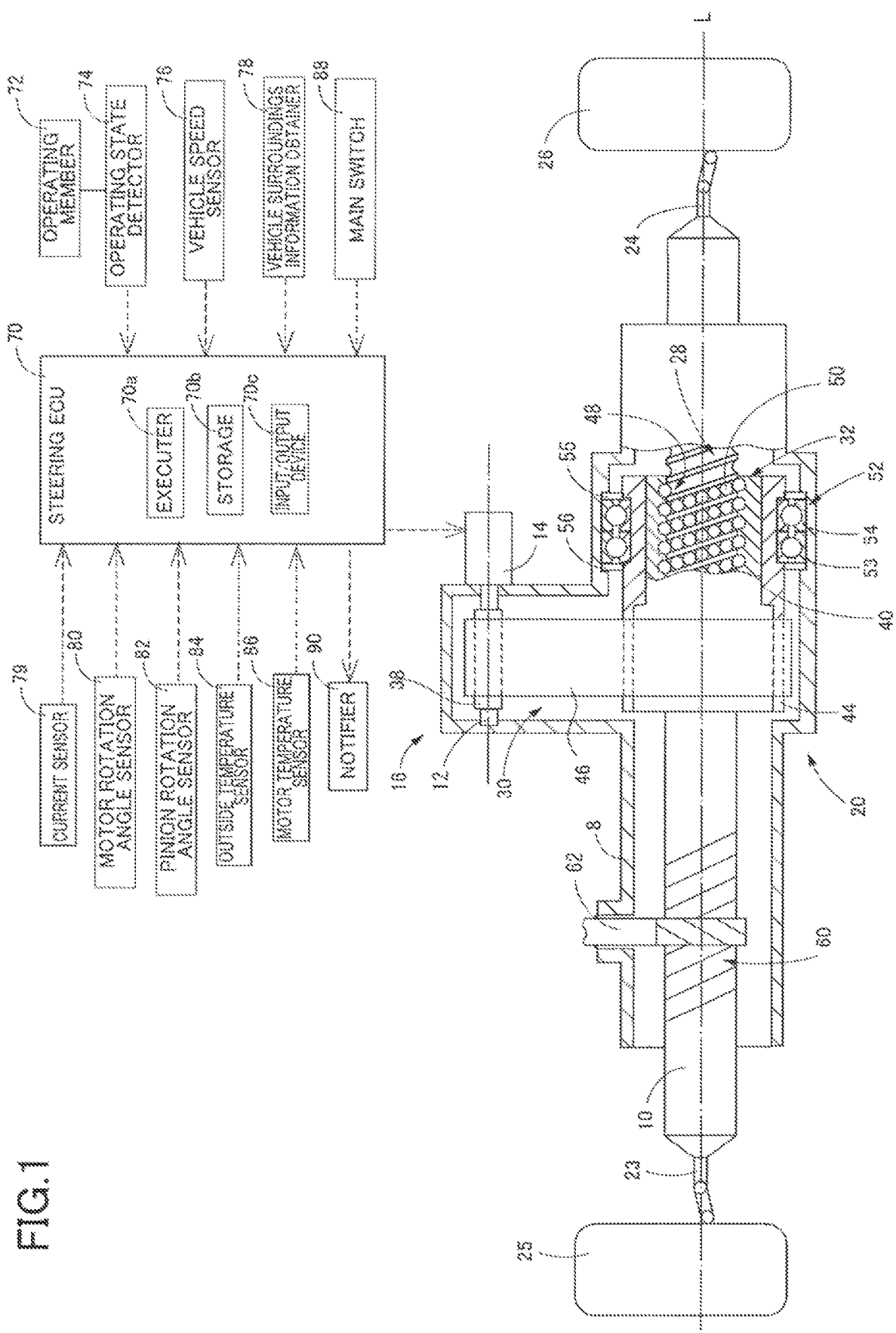
FIG. 1 is a view conceptually illustrating a steering system according to an embodiment of the present disclosure.

Referring to the drawings, there will be hereinafter described a steering system for steering wheels of a vehicle according to one embodiment of the present disclosure.

As illustrated in FIG. 1, the steering system according to the present embodiment is what is called steer-by-wire steering system. The steering system includes a steering device 20 that includes, for instance, a housing 8, a steering shaft (that may also be referred to as a rack bar) 10 extending in a width direction of the vehicle, an electric motor 14 as a drive source, a converter 16 configured to convert a rotational motion of the electric motor 14 into a movement of the steering shaft 10 in the width direction of the vehicle. The width direction of the vehicle will be hereinafter referred to as "axial direction of the steering shaft 10" or simply referred to as "axial direction" where appropriate. A reference sign "L" in FIG. 1 indicates the axis of the steering shaft 10.

The steering shaft 10 is a shaft (bar) that moves in the axial direction to steer the wheels. The steering shaft 10 is held by the housing 8 so as to be unrotatable relative to the housing 8 and movable in the axial direction relative to the housing 8. Tie rods 23, 24 are connected to the steering shaft 10, and wheels 25, 26 are connected to the tie rods 23, 24 via respective knuckle arms (not illustrated). The movement of the steering shaft 10 in the axial direction causes the wheels 25, 26 to be steered.

The electric motor 14 is held at a main body thereof by the housing 8. The electric motor 14 has an output shaft (that may also be referred to as a rotation shaft) 12 that extends in parallel with the steering shaft 10.

In the present embodiment, the converter 16 includes, for instance, a rotation transmitter 30 and a ball screw mechanism 32 as a motion converting mechanism. The rotation transmitter 30 has a function of a speed reducer. The rotation transmitter 30 reduces the rotation speed of the output shaft 12 of the electric motor 14 and boosts the torque of the output shaft 12 so as to transmit the boosted torque to a nut member 40. The rotation transmitter 30 includes a small-diameter pulley 38 fitted to the output shaft 12 of the electric motor 14 so as to be rotatable integrally with the output shaft 12, a large-diameter pulley 44 fitted to the nut member 40 so as to be rotatable integrally with the nut member 40, and a belt 46 looped over the small-diameter pulley 38 and the large-diameter pulley 44.

The large-diameter pulley 44 is held by the housing 8 via a bearing device 52 so as to be rotatable about the axis L. The nut, member 40 is attached to an inner circumferential portion of the large-diameter pulley 44. All of the small-diameter pulley 38, the large-diameter pulley 44, and the belt 46 are toothed. Owing to engagement of the teeth of the small-diameter pulley 38, the large-diameter pulley 44, and the belt 46, the rotation of the small-diameter pulley 38 is transmitted to the large-diameter pulley 44 through the belt 46 and then to the nut member 40.

In the present embodiment, the bearing device 52 includes two bearings 53, 54 arranged in the axial direction and a pair of disc springs 55, 56 respectively located on axially opposite sides of the two bearings 53, 54. The disc springs 55, 56 are elastically deformable by a force that acts in the axial direction. The disc springs 55, 56 have a function of absorbing an assembling error of the bearings 53, 54 and a function of reducing a noise generated due to the movement of the steering shaft 10.

The ball screw mechanism 32, which is a screw mechanism, converts a rotational motion of the nut member 40 into a linear movement that is then output to the steering shaft 10. The ball screw mechanism 32 includes a male thread portion 28 formed on an outer circumferential portion of the steering shall 10, a female thread portion 48 formed on an inner circumferential portion of the nut member 40, and a multiplicity of balls 50 interposed therebetween. The female thread portion 48 and the male thread portion 28 are threadedly engaged with each other through the balls 50.

A thread portion 60 is provided at a portion of the steering shaft 10 that is distant from the converter 16 in the axial direction while a pinion 62, which is threadedly engageable with the thread portion 60, is held by the housing 8. The pinion 62 is rotated in conjunction with the movement of the steering shaft 10 in the axial direction relative to the housing 8.

In the present embodiment, the rotation of the electric motor 14 causes the belt 46 to be moved, and the nut member 40 is thereby rotated, so that the steering shaft 10 is moved in the axial direction. The movement of the steering shaft 10 relative to the housing 8 in the axial direction causes the pinion 62 to be rotated. Thus, based on a rotation angle of the pinion 62, an amount of the movement of the steering shaft 10 can be estimated, and a rotation angle of the electric motor 14 can be estimated. In this respect, specifications of the steering system are set such that the rotation angle of the electric motor 14 from a zero point position thereof and the rotation angle of the pinion 62 from a zero point position thereof are equal when the converter 16 is normal.

The steering system includes a steering ECU 70 constituted mainly by a computer. The steering ECU 70 includes an executer 70a, a storage 70b, an input/output device 70c, and so on. Devices connected to the input/output device 70c include: an operating state detector 74 that detects an operating state of an operating member 72 operable by a driver; a vehicle speed sensor 76 that detects a running speed of the vehicle; a vehicle surroundings information obtainer 78; a current sensor 79 that detects an electric current that flows in the electric motor 14; a motor rotation angle sensor 80 that detects the rotation angle of the electric motor 14 from the zero point position; a pinion rotation angle sensor 82 that detects the rotation angle of the pinion 62 from the zero point position; an outside temperature sensor 84 that detects an outside temperature; a motor temperature sensor 86 provided for the electric motor 14 to detect a temperature of the electric motor 14 (hereinafter referred to as "motor temperature" where appropriate); a main switch 88 of the vehicle, and so on. Further, a notifier 90, the electric motor 14, etc., am connected to the input/output device 70c.

Though the operating member 72 may be a steering wheel, the operating member 72 may be a joystick, a mouse-shaped grip or the like. The operating state detector 74 is configured to detect an operation force applied to the operating member 72, an operation amount of the operating member 72, etc. The operating state detector 74 may include an operation-force sensor, an operation-amount sensor, etc. The vehicle speed sensor 76 is configured to detect the running speed of the vehicle. The vehicle surroundings information obtainer 78 includes a radar device, a camera, etc. The vehicle surroundings information obtainer 78 is configured to detect an object and the like present in the surroundings of an own vehicle that is the vehicle on which the present steering system is installed, obtain a relative positional relationship between the object and the own vehicle, and recognize a lane line to obtain a distance between the own vehicle and the lane line.

In the present embodiment, each of the motor rotation angle sensor 80 and the pinion rotation angle sensor 82 is a an absolute angle sensor. The zero point position of the electric motor 14 and the zero point position of the pinion 62 are respectively set as the position of the electric motor 14 and the position of the pinion 62 when the steering angle of the wheels 25, 26 is 0 in a case where the temperature of the steering system before shipment of the vehicle is a preset temperature (e.g., 20° C.). In other words, when the electric motor 14 and the pinion 62 are located at the respective zero point positions, the steering shaft 10 is located at a neutral position thereof and the steering angle of the wheels 25, 26 is 0. Thus, the own vehicle travels straight. In the present embodiment, the motor rotation angle sensor 80 corresponds to a motor rotation angle obtainer, and the pinion rotation angle sensor 82 corresponds to a pinion rotation angle obtainer.

The pinion 62 is rotated in conjunction with the movement of the steering shaft 10 in the axial direction. Accordingly, the rotation angle $\theta p$ of the pinion 62 from the zero point position is in a one-to-one correspondence with the amount of the movement (movement amount) of the steering shaft 10 from the neutral position. Thus, it may be considered that the rotation angle $\theta p$ of the pinion 62 form the zero point position is one example of a movement-amount-related amount and the pinion rotation angle sensor 82 is one example of a movement-amount-related-amount obtainer. Further, the rotation angle θp of the pinion 62 from the zero point position corresponds to the steering angle of the wheels 25, 26, and a velocity of change of the rotation angle θp of the pinion 62 from the zero point position corresponds to a steering speed. In the present embodiment, therefore, the rotation angle θp of the pinion 62 from the zero point position is employed as a value that is in a one-to-one correspondence with the steering angle of the wheels 25, 26, and a rotation angle velocity dθp, which is the velocity of change of the rotation angle of the pinion 62 from the zero point position, is employed as a value that is in a one-to-one correspondence with a speed of the movement (movement speed) of the steering shaft 10, namely, the steering speed.

There is established a predetermined relationship between the rotation angle θp of the pinion 62 from the zero point position and the rotation angle θm of the electric motor 14 from the zero point position, namely, a relationship in which the rotation angle θp of the pinion 62 from the zero point position and the rotation angle θm of the electric motor 14 from the zero point position are the same. Accordingly, the rotation angle θm of the electric motor 14 from the zero point position can be estimated based on the rotation angle θp of the pinion 62 from the zero point position. Thus, the movement-amount-related-amount obtainer may be considered as a rotation angle estimator that estimates the rotation angle of the electric motor 14.

In the following description, the rotation angle θp of the pinion 62 from the zero point position will be simply referred to as the rotation angle θp of the pinion 62 or the pinion rotation angle θp, and the rotation angle θm of the electric motor 14 from the zero point position will be simply referred to as the rotation angle θm of the electric motor 14 or the motor rotation angle θm. The movement amount of the steering shaft 10 from the neutral position will be simply referred to as the movement amount of the steering shaft 10 where appropriate.

The outside temperature sensor 84 detects the outside temperature, and the motor temperature sensor 86 detects the temperature in the electric motor 14. Owing to the motor temperature sensor 86, a heat generation state of the electric motor 14 can be grasped. The main switch 88 is turned to ON by an operation of the driver or the like to start the own vehicle. The notifier 90 notifies a malfunction of the steering system, etc. The notifier 90 may make notification visually or aurally and may include at least one of a display, a light source, a sound generator, a buzzer, and so on.

Figure 5:
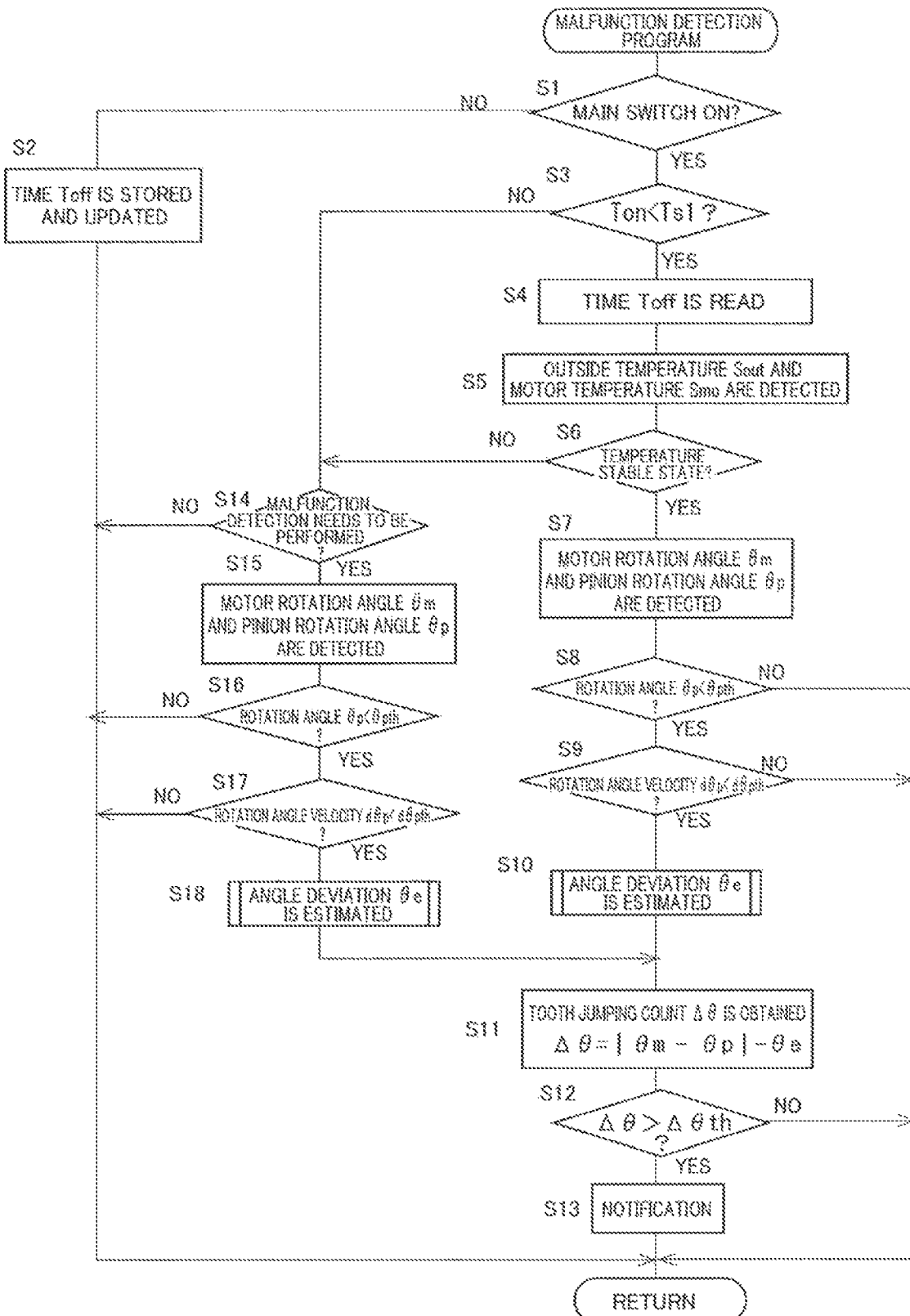
FIG. 5 is a flowchart representing a malfunction detection program stored in a storage of a steering ECU.
Figure 6:
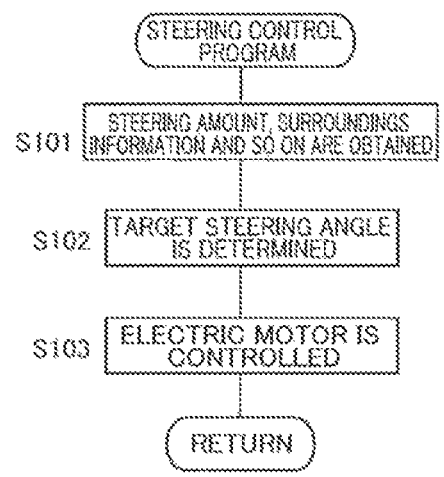
FIG. 6 is a flowchart representing a steering control program stored in the storage.
Figure 7:
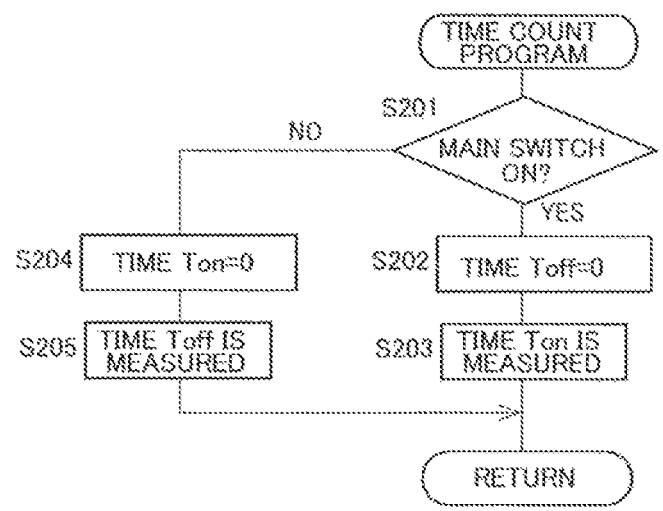
FIG. 7 is a flowchart representing a time count program stored in the storage.
Figure 10:
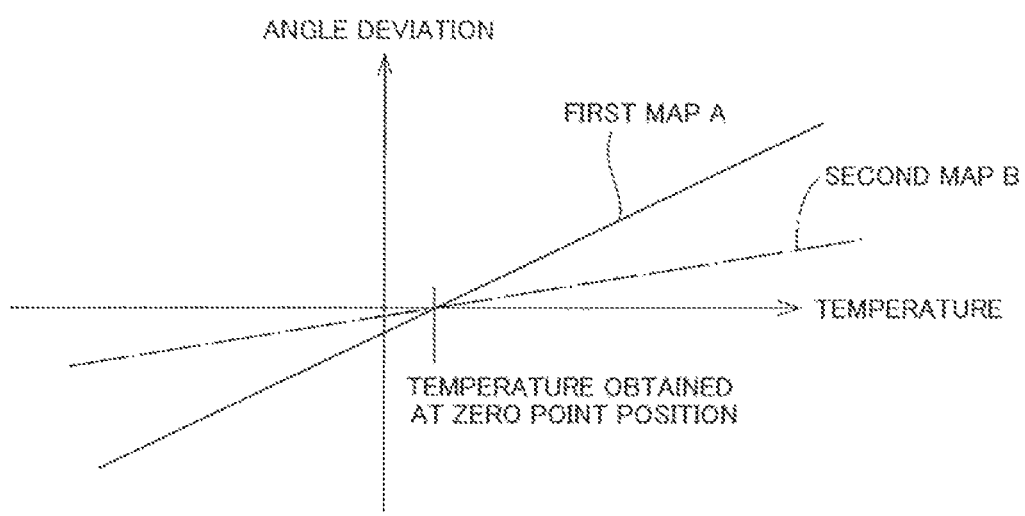
FIG. 10 is a view conceptually illustrating angle-deviation acquisition maps stored in the storage.

The storage 70b of the steering ECU 70 stores a malfunction detection program represented by a flowchart of FIG. 5, a steering control program represented by a flowchart of FIG. 6, a time count program represented by a flowchart of FIG. 7, angle-deviation acquisition maps illustrated in FIG. 10, etc.

In the steering system constructed as described above, a target steering angle of the wheels 25, 26 is obtained based on the operating state of the operating member 72, the relative positional relationship between the own vehicle and the object present in the surroundings of the own vehicle obtained by the vehicle surroundings information obtainer 78, etc. The electric motor 14 is operated such that an actual steering angle is brought close to the target steering angle, and the wheels 25, 26 are steered. The steering control program illustrated in FIG. 6 is executed at a predetermined time pitch.

At Step 101, there are obtained a value indicative of the operating state of the operating member 72 detected by the operating state detector 74, the relative positional relationship between the own vehicle and the object and the like present in the surroundings of the own vehicle obtained by the vehicle surroundings information obtainer 78, etc. (Step 101 will be hereinafter abbreviated as "S101". Other steps are similarly abbreviated.) Based on the value indicative of the operating state of the operating member 72, the relative positional relationship, etc., obtained at S101, there is obtained, at S102, the target steering angle of the wheels 25, 26, i.e., a target movement amount of the steering shaft 10 that corresponds to the target steering angle of the wheels 25, 26 in the present embodiment. At S103, the electric motor 14 is operated such that an actual movement amount of the steering shaft 10 obtained based on the pinion rotation angle θp is brought close to the target movement amount. As a result, the steering shaft 10 is moved in the axial direction, and the wheels 25, 26 are steered.

Figure 2A:
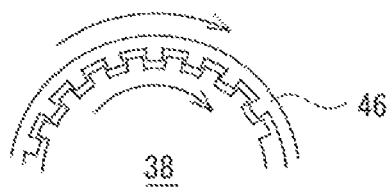
FIG. 2A is a view illustrating a state of proper meshing engagement of teeth of a small-diameter pulley and teeth of a belt in a normal state, both of which are constituent elements of a converter of the steering system.
Figure 2B:
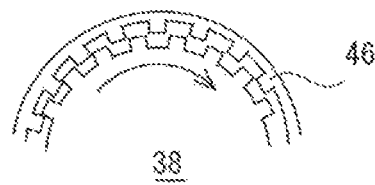
FIG. 2B is a view illustrating a state of improper meshing engagement of the teeth of the small-diameter pulley and the teeth of the belt in a state in which tooth jumping occurs.
Figure 3:
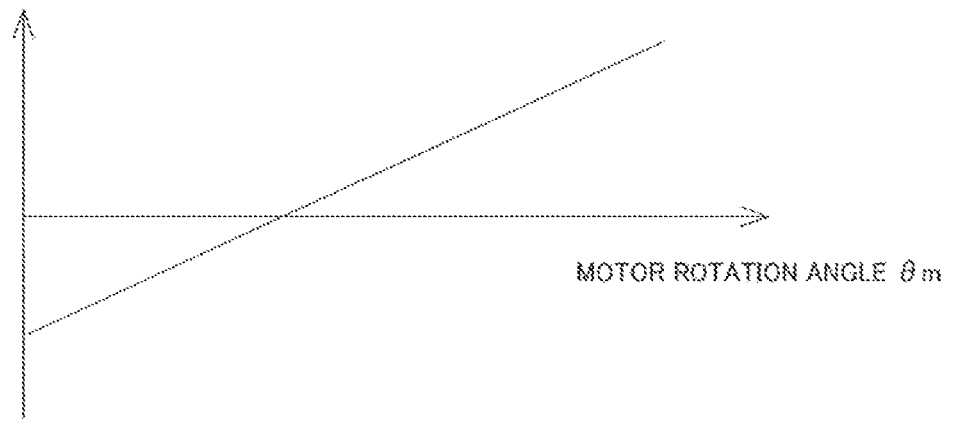
FIG. 3 is a view conceptually illustrating a relationship between a rotation angle of an electric motor from a zero point position thereof and an amount of a movement of a steering shaft from a neutral position thereof (a rotation angle of a pinion from a zero point position thereof) when the converter is normal.

In a case where the converter 16 is normal, namely, in a state in which the belt 46 is not so elongated and the teeth of the small-diameter pulley 38 and the teeth of the belt 46 are in proper meshing engagement with each other as illustrated in FIG. 2A, the rotational motion of the electric motor 14 causes the belt 46 to be moved, and the nut member 40 is accordingly rotated, so that the steering shaft 10 is moved and the wheels 25, 26 are steered. (The state of meshing engagement of the teeth of the small-diameter pulley 38 and the teeth of the belt 46 illustrated in FIGS. 2A and 2B is similar for the large-diameter pulley 44.) Thus, the rotation angle θm of the electric motor 14 from the zero point position and the steering angle of the wheels 25, 26 are in a one-to-one correspondence, as illustrated in FIG. 3. When the rotation angle θm of the electric motor 14 increases, the movement amount of the steering shall 10 is linearly increased, so that the steering angle of the wheels 25, 26 is increased. In this state, the rotation angle θm of the electric motor 14 and the rotation angle θp of the pinion 62 should be equal to each other.

In a case where the belt 46 is elongated too much, however, the teeth of the small-diameter pulley 38 and the teeth of the belt 46 fail to properly engage with each other, causing a phenomenon in which the belt 46 does not move and the nut member 40 does not rotate even if the small-diameter pulley 38 rotates, namely, what is called tooth jumping occurs, as illustrated in FIG. 2B, for instance. The tooth jumping is a phenomenon in which the small-diameter pulley 38 rotates relative to the belt 46 in a state in which the teeth of the small-diameter pulley 38 and the teeth of the belt 46 are out of mesh. In other words, the tooth jumping is a phenomenon in which the teeth of the small-diameter pulley 38 jump the teeth of the belt 46.

Here, the number of teeth of the belt 46 that the teeth of the small-diameter pulley 38 jump is referred to as a tooth jumping count. In a case where the tooth jumping count is large, the steering shaft 10 is located at a position that deviates from the neutral position and the wheels 25, 26 are in a steered state even if the electric motor 14 is located at the zero point position.

It is known that the tooth jumping is likely to occur in rotation of the small-diameter pulley 38 and the belt 46 in one direction in view of the engagement state therebetween.

In the present embodiment, there is obtained, as the tooth jumping count, an absolute value of a difference Δθ between: the rotation angle Gm of the electric motor 14; and the rotation angle θp of the pinion 62 that is a physical amount having a one-to-one correspondence with the actual movement amount of the steering shaft 10 from the neutral position. When the tooth jumping count is greater than a malfunction determination threshold Δθth, it is detected that the converter 16 is abnormal, in other words, the converter 16 is suffering from a malfunction.

For instance, the malfunction determination threshold $\Delta\theta$th is set as the tooth jumping count obtained in a case in which the belt 46 is desired to undergo maintenance such as an inspection. In other words, the malfunction determination threshold $\Delta\theta$th is set as the tooth jumping count obtained in a case in which a need of replacing the belt 46 is not high but it is desirable to inspect an elongated state of the belt 46.

$|p-\theta m|>\Delta\theta th$

Even if the converter 16 is normal and the tooth jumping count is 0, the rotation angle $\theta p$ of the pinion 62 and the rotation angle $\theta m$ of the electric motor 14 sometimes differ from each other. In a case where the temperature of the steering system is not 20° C., the pinion 62 held by the housing 8 is moved relative to the steering shaft 10 due to a difference in thermal expansion coefficient between the housing 8 and the steering shaft 10. In this case, the pinion rotation angle $\theta p$ differs from the motor rotation angle $\theta m$. In the present embodiment, the housing 8 is formed of an aluminum alloy, and the steering shaft 10 is formed of a material including iron. The thermal expansion coefficient of an aluminum alloy is larger than that of iron. Accordingly, the amount of change of the length of the housing 8 in the axial direction is larger than the amount of change of the length of the steering shaft 10 in the axial direction.

In the present embodiment, an angle deviation $\theta e$, which is a difference between the pinion rotation angle $\theta p$ and the motor rotation angle $\theta m$ generated when the tooth jumping count is 0, is estimated based on the temperature of the steering system, and the presence or absence of the malfunction of the converter 16 is detected in consideration of the angle deviation $\theta e$.

A relationship between the temperature and the angle deviation $\theta e$ generated due to the temperature is obtained in advance. The relationship is mapped and stored, one example of which is illustrated in FIG. 10.

The solid line in FIG. 10 is a first map A that represents the temperature and the angle deviation $\theta c$ generated by the relative movement of the housing 8 and the steering shaft 10 due to the difference in thermal expansion coefficient therebetween, etc. The long dashed short dashed line in FIG. 10 is a second map B that represents a relationship between the temperature and the angle deviation $\theta e$ due to a change of the lead of the thread portion 61) caused by the thermal expansion of the steering shaft 10.

The temperature of the housing 8 and the temperature of the steering shaft 10 are estimated based on the outside temperature detected by the outside temperature sensor 84, the motor temperature detected by the motor temperature sensor 86, etc. It is apparent from experiments and simulations that the temperature of the housing 8 and the temperature of the steering shaft 10 are substantially the same.

Accordingly, in a stop state of the electric motor 14, it is estimated that the temperature of the housing 8 and the steering shaft 10 is equal to the outside temperature or the motor temperature. Further, in the operating state of the electric motor 14, the temperature of the housing 8 and the temperature of the steering shaft 10 are determined based on the temperature (the heat generation state) of the electric motor 14, and it is estimated that the temperature of the housing 8 and the temperature of the steering shaft 10 are substantially the same.

In the present embodiment, the temperature of the housing 8 and the steering shaft 10 may be estimated as the temperature of the steering system or the temperature in the steering system. The temperature Smo in the electric motor 14 detected by the motor temperature sensor 86 may be estimated as the temperature in the steering system.

The presence or absence of the malfunction is preferably detected in a stable state of the temperature in which the temperature of the steering system is stable because the angle deviation $\theta e$ can be accurately estimated in the stable state of the temperature. The stable state of the temperature refers to a state in which an amount of change in the temperature of the steering system is not greater than a set amount of change and the temperature is substantially constant.

For instance, it may be considered that the temperature of the steering system is in the stable state in a case where the electric motor 14 is kept stopped for a long length of time, in a case where the difference between the temperature of the steering system and the outside temperature is not greater than a set value, etc. In the stable state of the temperature, it is usual that the vehicle is at a stop and the electric motor 14 is in a stop state. It is thus considered that the temperature is in the stable state when a time that elapses after the main switch 88 of the vehicle has been switched from OFF to ON is short.

In the present embodiment, therefore, it is estimated that the temperature is in the stable state and the presence or absence of the malfunction is detected at least one of: i) when an ON time Ton, which is a length of time during which the main switch 88 is ON after the main switch 88 has been switched from OFF to ON, is shorter than a first set time Ts1 and an OFF time Toff, which is a length of time during which the main switch 88 is OFF, is longer than a second set time Ts2; and ii) when an absolute value of a difference between the outside temperature Sout detected by the outside temperature sensor 84 and the motor temperature Smo detected by the motor temperature sensor 86 is less than the predetermined value, i.e., a temperature threshold Sth.

The second set time Ts2 is a sufficiently long length of time. For instance, the second set time Ts2 is set as a length of time during which the temperature of the steering system is estimated to be substantially constant and equal to the outside temperature.

On the other hand, the first set time Ts1 is a length of time sufficiently shorter than the second set time Ts2. For instance, the first set time Ts1 is set as a length of time during which the temperature is unlikely to change even if the main switch 88 is turned to ON. Specifically, the first set time TO) may be set as a length of time during which usual initial checking is performed or a length of time longer than that, $Ton<Ts1 Toff>>Ts2$ The OFF time Toff and the ON time Ton are obtained by executing the time count program illustrated in FIG. 7.

At S201, it is determined whether the main switch 88 is ON. When an affirmative determination (YES) is made at S201, the OFF time Toff is made equal to 0 at S202 and the ON time Ton is counted at S203. The ON time Ton increases with an increase in the length of time during which the main switch 88 is continuously ON.

When a negative determination (NO) is made at S201, the ON time Ton is made equal to 0 at S204 and the OFF time Toff is counted at 205. The OFF time Toff increases with an increase in the length of time during which the main switch 88 is continuously OFF.

The temperature threshold Sth is set such that the motor temperature Smo can be regarded as being substantially equal to the outside temperature Sout when the absolute value of the difference therebetween is smaller than the temperature threshold Sth.

$$|Sout-Smo|<Sth$$

When the temperature is in the stable state, the temperature of the housing 8 and the steering shaft 10 is estimated based on the motor temperature Smo and/or the outside temperature Sout. A first angle deviation θe1 is obtained based on the estimated temperature and the first map A, and the first angle deviation θe1 is determined to be the angle deviation θe.

$$\theta e=\theta e1$$

Even if the temperature is not in the stable state, there is a case in which a necessity to detect the presence or absence of the malfunction is high, namely, the necessity to perform malfunction detection to detect the presence or absence of the malfunction is high. For instance, if the malfunction detection has not been performed for a long period of time, the necessity to perform the malfunction detection is high and the malfunction detection is therefore performed. When the malfunction detection is performed in this instance, the electric motor 14 may be in the heat generation state and the temperature of the housing 8 and the steering shaft 10 is estimated based on the motor temperature Smo detected by the motor temperature sensor 86.

A sum of: the first angle deviation θe1 obtained based on the estimated temperature and the first map A; and a second angle deviation θe2 obtained based on the estimated temperature and the second map B is determined to be the angle deviation θe. Because the electric motor 14 is in a controlled state, the second angle deviation θe2 needs to be considered. Because extension and contraction of the pinion 62 in the axial direction due to heat are small, extension and contraction of the steering shaft 10 in the axial direction are considered.

$$\theta e=\theta e1+\theta e2$$

Figure 4A:
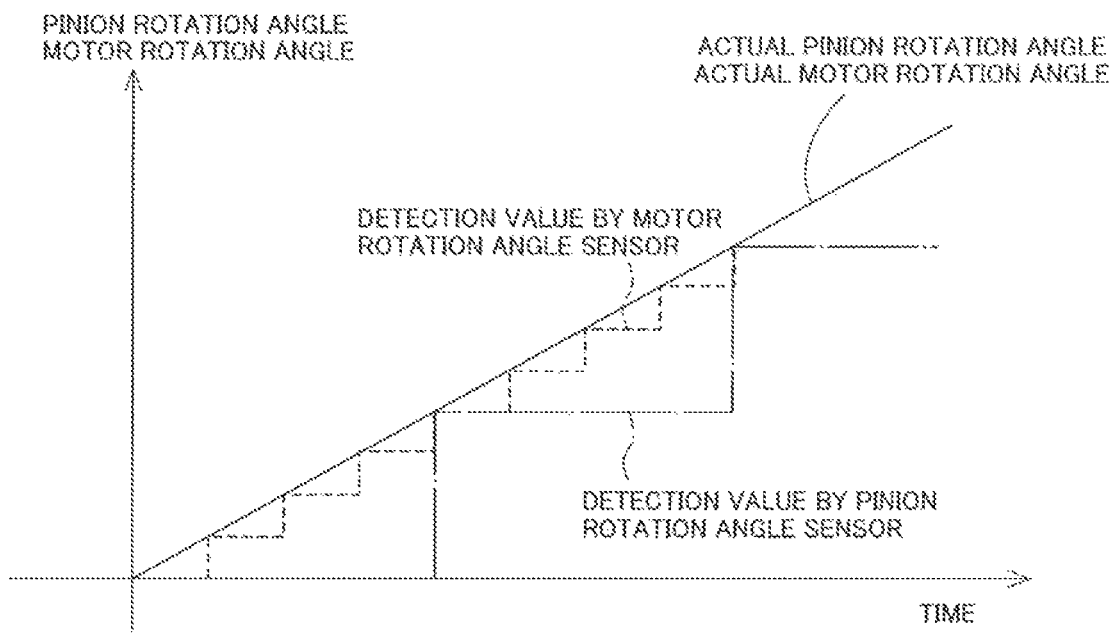
FIG. 4A is a view conceptually illustrating a change in the rotation angle of the electric motor detected by a motor rotation angle sensor and a change in the rotation angle of the pinion detected by a pinion rotation angle sensor in the steering system when a steering speed is high.
Figure 4B:
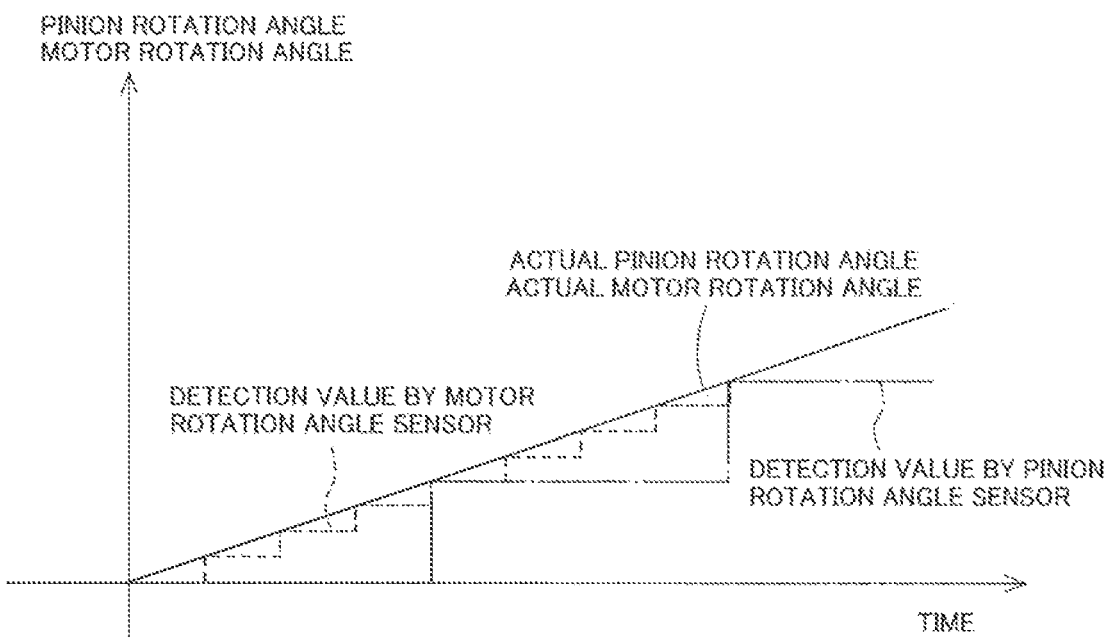
FIG. 4B is a view conceptually illustrating the change in the rotation angle of the electric motor detected by the motor rotation angle sensor and the change in the rotation angle of the pinion detected by the pinion rotation angle sensor in the steering system when the steering speed is low.

The malfunction detection to detect the presence or absence of the malfunction according to the present embodiment is performed when the steering speed, namely, the movement speed of the steering shaft 10, is lower than a set movement speed. As illustrated in FIG. 4A, the detection cycle of the pinion rotation angle sensor 82 is longer than that of the motor rotation angle sensor 80. Accordingly, a difference between the rotation angle θp of the pinion 62 and the rotation angle θm of the electric motor 14 may be large due to the difference in the detection cycle. As illustrated in FIGS. 4A and 4B, the difference between the rotation angle θp of the pinion 62 and the rotation angle θm of the electric motor 14 is larger when the steering speed is high than when the steering speed is low.

In the present embodiment, the set movement speed is set to a speed at which a difference between the pinion rotation angle θp that is a detection value by the pinion rotation angle sensor 82 and the motor rotation angle θm that is the detection value by the motor rotation angle sensor 80 is not likely to be large. When the rotation angle velocity dθp of the pinion 62 that corresponds to the steering speed is not lower than a set speed dθpth that corresponds to the set movement speed, the malfunction detection is not performed. When the rotation angle velocity dθp of the pinion 62 is lower than the set speed dθpth, it is estimated that the movement speed of the steering shaft 10 is lower than the set movement speed and the malfunction detection is performed.

In a case where the malfunction detection to detect the presence or absence of the malfunction is performed during the initial checking, it is usual that the movement speed of the steering shaft 10 is lower than the set movement speed. In the present embodiment, to stay on the safe side, it is determined in this case whether the movement speed of the steering shaft 10 is lower than the set movement speed.

The malfunction detection is performed in a state in which the steering angle of the wheels 25, 26 is smaller than a set steering angle. This is because an influence of disturbance is larger when the steering angle of the wheels 25, 26 is larger than when the steering angle of the wheels 25, 26 is small.

In the present embodiment, the malfunction detection is not performed when the pinion rotation angle θp that corresponds to the steering angle of the wheels 25, 26 is not less than a set angle θpth that corresponds to the set steering angle but is performed when the pinion rotation angle θp is less than the set angle θpth.

In the present embodiment, the malfunction detection program represented by the flowchart of FIG. 5 is executed at a predetermined time pitch.

At S1, it is determined whether the main switch 88 is ON. When the main switch 88 is OFF, the OFF time Toff is read and stored at S2. The OFF time Toff is updated as needed, When the main switch 88 is ON, the control flow proceeds to S3 at which the ON time Ton is read and it is determined whether the ON time Ton is shorter than the first set time Ts1. When an affirmative determination (YES) is made at S3, the OFF time Toff is read at S4, the outside temperature Sout and the motor temperature Smo am read at S5, and it is determined at 56 whether the temperature of the steering system is in the stable state. In the present embodiment, it is determined that the temperature is in the stable state at least one of: i) when the ON time Ton is shorter than the first set time Ts1 and the OFF time Toff is longer than the second set time Ts2 that is sufficiently longer than the first set time Ts1; and ii) when the absolute value of the difference between the outside temperature Sout and the motor temperature Smo is less than the temperature threshold Sth.

Figure 8:
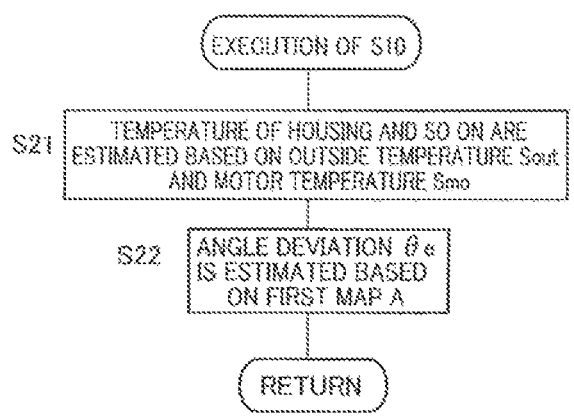
FIG. 8 is a flowchart representing part (S10) of the malfunction detection program.

When an affirmative determination (YES) is obtained at S6, the motor rotation angle θm and the pinion rotation angle θp are obtained at S7, it is determined at S8 whether the rotation angle θp of the pinion 62 is less than the set angle θpth, and it is determined at S9 whether the rotation angle velocity dθp of the pinion 62 is lower than the set speed dθpth. When an affirmative determination (YES) is made both at S8 and S9, the angle deviation θe is estimated at S10. Specifically, as indicated in the flowchart of FIG. 8, the temperature of the housing 8 and the steering shaft 10 is estimated at S21 based on the outside temperature Sout and the motor temperature Smo. At S22, the first angle deviation θe1 is obtained according to the first map A. Thus, the angle deviation Ge is obtained.

Subsequently, at S11, the tooth jumping count is obtained as a value obtained by subtracting the angle deviation θe from the absolute value of the difference between the pinion rotation angle θp and the motor rotation angle θm.

It is determined at S12 whether the tooth jumping count is greater than a first malfunction determination threshold Δθth. When an affirmative determination (YES) is made at S12, the control flow proceeds to S13 to notify that the tooth jumping count is greater than the first malfunction determination threshold Δθth.

When a negative determination (NO) is made at S6, it is determined at S14 whether the necessity to perform the malfunction detection to detect the presence or absence of the malfunction is high. When an affirmative determination (YES) is made at S14, the motor rotation angle θm and the pinion rotation angle θp are obtained at S15, it is determined at S16 whether the rotation angle θp of the pinion 62 is smaller than the set angle θpth, and it is determined at S17 whether the rotation angle velocity dθp of the pinion 62 is lower than the set speed dθpth. Because the electric motor 14 may be operating in a case in which an affirmative determination (YES) is made at S16, the rotation angle velocity dθp of the pinion 62 may be higher than the set speed dθpth (S17: NO). In this case, the malfunction detection is not performed.

Figure 9:
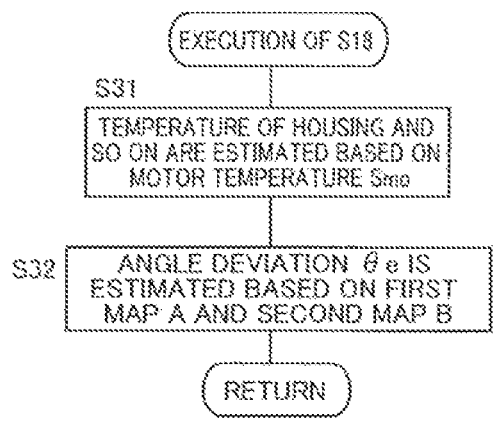
FIG. 9 is a flowchart representing another part (S18) of the malfunction detection program.

When an affirmative determination (YES) is made both at S16 and S17, the angle deviation θe is obtained at S18. Specifically, as indicated by the flowchart of FIG. 9, the temperature of the housing 8 and the temperature of the steering shaft 10 are estimated at S31 based on the motor temperature Smo. Because the electric motor 14 is generating heat, the temperature of the housing 8 and the steering shaft 10 is high. At S32, the first angle deviation θe1 and the second angle deviation θe2 are obtained based on the estimated temperature, the first map A, and the second map B, and a sum of those is determined to be the angle deviation Ge. Subsequently, S11-S13 are executed similarly as described.

As explained above, the temperature state is considered in the present embodiment, whereby the tooth jumping count can be accurately obtained. Because the tooth jumping count can be accurately obtained, it is possible to detect that the converter 16 reaches a condition in which maintenance of the belt 46 is desirable, which is prior to a condition in which a necessity to replace the belt 46 is high. Thus, the safety of the vehicle is enhanced.

In a case where the converter 16 reaches the condition in which the necessity of replacement of the belt 46 is high, the difference between the pinion rotation angle θp and the motor rotation angle θm is sufficiently large. Accordingly, it is possible to accurately determine whether the absolute value of the difference Δθ between the pinion rotation angle θp and the motor rotation angle θm is greater than a second malfunction determination threshold that is greater than the first malfunction determination threshold utilized as the malfunction determination threshold in the embodiment illustrated above, even without considering the angle deviation θe generated due to the temperature. It is thus possible to appropriately notify the high necessity of replacement of the belt 46.

In a case in which it is not needed to replace the belt 46 immediately but it is desirable to perform maintenance in view of elongation of the belt 46, it may be difficult to determine whether the difference between the pinion rotation angle θp and the motor rotation angle θm is due to the tooth jumping or due to the temperature.

In the present embodiment, the angle deviation θe generated due to the temperature is considered, so that the tooth jumping count can be accurately obtained. This enables appropriate detection of the condition of the belt 46 in which maintenance thereof is desirable. Further, the tooth jumping count can be more accurately detected by considering the steering speed and the steering angle.

In the embodiment illustrated above, a controller is constituted by the steering ECU 70, etc. A malfunction detector is constituted by a portion of the controller that stores the malfunction detection program represented by the flowchart of FIG. 5, a portion of the controller that executes the program, etc. A stable-state malfunction detector is constituted by a portion of the malfunction detector that stores S1-S13, a portion of the malfunction detector that executes S1-S13, etc. An unstable-state malfunction detector is constituted by a portion of the malfunction detector that stores S14-S18 and S11-S13, a portion of the malfunction detector that executes S14-S18 and S11-S13, etc.

In the embodiment illustrated above, the malfunction detection to detect the presence or absence of the malfunction is performed even when the temperature state of the steering system is unstable. This is not essential. The malfunction detection may be performed only when the temperature state is stable. In this case, S14-S18 are omitted.

In place of the pinion rotation angle sensor 82, there may be provided a linear sensor that is capable of detecting the movement amount of the steering shaft 10. In this case, the rotation angle of the electric motor 14 can be estimated based on the detection value by the linear sensor. It is to be understood that the present disclosure is not limited to the details of the illustrated embodiment, but may be embodied with various changes and modifications, which may occur to those skilled in the art, without departing from the spirit and the scope of the disclosure. For instance, the steering system may have any configuration.

Claimable Invention (1) A steering system configured to steer wheels of a vehicle by a movement of a steering shaft, including:

the steering shaft;

an electric motor;

a converter configured to convert a rotational motion of the electric motor into the movement of the steering shaft;

a motor rotation angle obtainer configured to obtain a rotation angle of the electric motor from a zero point position thereof;

a movement-amount-related-amount obtainer configured to obtain a movement-amount-related amount that is an amount of the movement of the steering shaft from a neutral position thereof or a physical amount that is in a one-to-one correspondence with the amount of the movement of the steering shaft from the neutral position; and a controller configured to control the electric motor, wherein the controller includes a malfunction detector configured to detect a presence or absence of a malfunction of the converter in a mode that differs depending on a temperature state of the steering system, based on the rotation angle of the electric motor from the zero point position obtained by the motor rotation angle obtainer and the movement-amount-related amount obtained by the movement-amount-related-amount obtainer.

The temperature state is represented by a degree of the temperature, a degree of change in the temperature, etc.

The motor rotation angle obtainer may be configured to detect an absolute rotation angle that is the rotation angle of the electric motor from the zero point position. The motor rotation angle obtainer may be configured to include a relative rotation angle sensor for detecting a relative rotation angle that is an angle by which the electric motor is rotated, i.e., an angle by which the electric motor is rotated in a time period from previous defection to current detection and to obtain the rotation angle from the zero point position based on the detection value by the relative rotation angle sensor. This is true of the movement-amount-related-amount obtainer.

Examples of the movement-amount-related amount include the movement amount from the neutral position and the physical amount that is in a one-to-one correspondence with the movement amount from the neutral position.

(2) The steering system according to the form (1), wherein the malfunction detector is configured to detect the presence or absence of the malfunction of the converter in a mode that differs between a stable state in which the temperature state of the steering system is stable and an unstable state in which the temperature state of the steering system is unstable.

(3) A steering system configured to steer wheels of a vehicle by a movement of a steering shaft, including:
the steering shaft;
an electric motor;
a converter configured to convert a rotational motion of the electric motor into the movement of the steering shaft;
a motor rotation angle obtainer configured to obtain a rotation angle of the electric motor from a zero point position thereof;
a movement-amount-related-amount obtainer configured to obtain a movement-amount-related amount that is an amount of the movement of the steering shaft from a neutral position thereof or a physical amount that is in a one-to-one correspondence with the amount of the movement of the steering shaft from the neutral position; and
a controller configured to control the electric motor,
wherein the controller includes a stable-state malfunction detector configured to detect a presence or absence of the malfunction of the converter in a stable state in which the temperature state of the steering system is stable, based on the rotation angle of the electric motor from the zero point position obtained by the motor rotation angle obtainer and the movement-amount-related amount obtained by the movement-amount-related-amount obtainer.

(4) The steering system according to the form (2) or (3),
wherein the controller includes a time counter, and
wherein the malfunction detector estimates that the temperature state of the steering system is the stable state and detects the presence or absence of the malfunction of the converter when a time that elapses after a main switch of the vehicle on which the steering system is installed is switched from OFF to ON is shorter than a first set time and a time during which the main switch is OFF is longer than a second set time that is longer than the first set time.

(5) The steering system according to any one of the forms (2) through (4), further comprising an outside temperature sensor configured to detect an outside temperature and a system temperature sensor configured to detect a temperature of the steering system,
wherein the malfunction detector estimates that the temperature state of the steering system is the stable state and detects the presence or absence of the malfunction of the converter when an absolute value of a difference between a detection value by the outside temperature sensor and a detection value by the system temperature sensor is smaller than a set value.

The motor temperature sensor that detects the temperature of the electric motor may be used as the system temperature sensor.

(6) The steering system according to any one of the forms (1) through (5), wherein the malfunction detector detects the presence or absence of the malfunction of the converter when a speed of the movement of the steering shaft is lower than a set movement speed.

(7) The steering system according to any one of the forms (1) through (6), wherein the malfunction detector detects the presence or absence of the malfunction of the converter when the movement-amount-related amount obtained by the movement-amount-related-amount obtainer is less than a set movement-amount-related amount.

(8) The steering system according to any one of the forms (1) through (7),
wherein the movement-amount-related-amount obtainer includes a rotation angle estimator configured to estimate the rotation angle of the electric motor from the zero point position based on the amount of the movement of the steering shaft from the neutral position, and
wherein the malfunction detector detects that the converter is suffering from the malfunction when an absolute value of a difference between the rotation angle of the electric motor from the zero point position estimated by the rotation angle estimator and the rotation angle of the electric motor from the zero point position obtained by the motor rotation angle obtainer is greater than a predetermined malfunction determination threshold.

In a case where the temperature in the system is the preset temperature and the converter is normal, the estimated rotation angle of the electric motor from the zero point position and the obtained rotation angle of the electric motor from the zero point position are the same.

(9) The steering system according to the form (8),
wherein the malfunction detector is configured to correct, based on the temperature state of the steering system, an absolute value of a difference between the rotation angle of the electric motor from the zero point position estimated by the rotation angle estimator and the rotation angle of the electric motor from the zero point position obtained by the motor rotation angle obtainer, and
wherein the malfunction detector detects that the converter is suffering from the malfunction when a value, which is obtained by correcting the absolute value of the difference based on temperature state of the steering system, is greater than the malfunction determination threshold.

instead of correcting, based on the temperature state of the steering system, the absolute value of the difference between the rotation angle of the electric motor from the zero point position estimated by the rotation angle estimator and the rotation angle of the electric motor from the zero point position obtained by the motor rotation angle obtainer, the malfunction determination threshold may be corrected based on the temperature state of the steering system.

(10) The steering system according to the form (9),
wherein the malfunction determination threshold is a value indicating that the converter is in a state in which the converter is desired to undergo maintenance,
wherein the malfunction detector detects that the converter is in the state in which the converter is desired to undergo the maintenance when the value obtained by correcting the absolute value of the difference based on the temperature state of the steering system is greater than a first malfunction determination threshold that is the malfunction determination threshold, and
wherein the malfunction detector detects that the converter is in a state in which at least one of a plurality of constituent elements of the converter is desired to be replaced when the absolute value of the difference is greater than a second malfunction determination threshold that is greater than the first malfunction determination threshold.

(11) The steering system according to any one of the forms (8) through (10),
wherein the steering shaft is held by a housing so as to be movable in an axial direction thereof relative to the housing, and
wherein the rotation angle estimator includes a pinion that is held by the housing and that is threadedly engaged with a thread portion provided on the steering shaft and a pinion rotation angle obtainer configured to obtain a rotation angle of the pinion from a zero point position thereof.

Like the motor rotation angle obtainer, the pinion rotation angle obtainer may be configured to detect an absolute rotation angle of the pinion from the zero point position or may be configured to obtain the absolute rotation angle based on a relative rotation angle of the pinion.

(12) The steering system according to any one of the forms (1) through (11),
wherein the movement-amount-related-amount obtainer includes a rotation angle estimator configured to estimate the rotation angle of the electric motor from the zero point position based on the amount of the movement of the steering shalt from the neutral position,
wherein the malfunction detector detects that the converter is suffering from the malfunction when a value, which is obtained by subtracting a correction value from an absolute value of a difference between the rotation angle of the electric motor from the zero point position estimated by the rotation angle estimator and the rotation angle of the electric motor from the zero point position obtained by the motor rotation angle obtainer, is greater than a malfunction determination threshold, and
wherein the correction value is made smaller when the temperature state of the steering system is a stable state than when the temperature state of the steering system is an unstable state.

The correction value is determined based on a difference in thermal expansion coefficient between the pinion and the housing, thermal expansion of the steering shaft, etc. In the embodiment illustrated above, the correction value corresponds to the angle deviation. Further, the correction value when the temperature state is the stable state corresponds to the first angle deviation, and the correction value when the temperature state is the unstable state corresponds to a sum of the first angle deviation and the second angle deviation.

(13) The steering system according to the form (12),
wherein the converter includes a rotation transmitter configured to transmit the rotational motion of the electric motor to a nut member fitted to the steering shaft and a motion converting mechanism configured to convert a rotational motion of the nut member into a linear movement of the steering shaft, and
wherein the rotation transmitter includes a small-diameter pulley fitted to an output shaft of the electric motor so as to be rotatable integrally with the output shaft, a large-diameter pulley fitted to the nut member so as to be rotatable integrally with the nut member, and a toothed belt looped over the small-diameter pulley and the large-diameter pulley.

(14) The steering system according to the form (13),
wherein the steering shaft is held by a housing so as to be movable in an axial direction thereof relative to the housing,
wherein the movement-amount-related-amount obtainer includes a pinion that is held by the housing and that is threadedly engaged with a thread portion provided on the steering shaft and a pinion rotation angle obtainer configured to obtain a rotation angle of the pinion from a zero point position thereof, the movement-amount-related-amount obtainer being configured to obtain the rotation angle of the pinion from the zero point position obtained by the pinion rotation angle obtainer as the rotation angle of the electric motor from the zero point position,
wherein the malfunction detector is configured to obtain, as a tooth jumping count of at least one of the small-diameter pulley and the large-diameter pulley with respect to the toothed belt, an absolute value of a difference between the rotation angle of the pinion from the zero point position obtained by the pinion rotation angle obtainer and the rotation angle of the electric motor from the zero point position obtained by the motor rotation angle obtainer, and
wherein the malfunction detector detects that the converter is suffering from the malfunction when a value obtained by subtracting the correction value from the tooth jumping count is greater than the malfunction determination threshold.

(15) A steering system configured to steer wheels of a vehicle by a movement of a steering shaft, including:
the steering shaft;
an electric motor;
a converter configured to convert a rotational motion of the electric motor into a movement of the steering shaft;
a motor rotation angle obtainer configured to obtain a rotation angle of the electric motor from a zero point position thereof;
a movement-amount-related-amount obtainer configured to obtain a movement-amount-related amount that is an amount of the movement of the steering shaft from a neutral position thereof or a physical amount that is in a one-to-one correspondence with the amount of the movement of the steering shaft from the neutral position; and
a controller configured to control the electric motor,
wherein the controller includes a malfunction detector that detects a presence or absence of the malfunction of the converter when a speed of the movement of the steering shaft is lower than a set movement speed, based on the rotation angle of the electric motor obtained by the motor rotation angle obtainer and the movement-amount-related amount obtained by the movement-amount-related-amount obtainer.

The steering system in this form may employ the technical features described in any one of the forms (1)-(14).

What is claimed is:

1. A steering system configured to steer wheels of a vehicle by a movement of a steering shaft, comprising:
the steering shaft;
an electric motor;
a converter configured to convert a rotational motion of the electric motor into the movement of the steering shaft;
a motor rotation angle obtainer configured to obtain a rotation angle of the electric motor from a zero point position thereof;
a movement-amount-related-amount obtainer configured to obtain a movement-amount-related amount that is an amount of the movement of the steering shaft from a neutral position thereof or a physical amount that is in a one-to-one correspondence with the amount of the movement of the steering shaft from the neutral position; and
a controller configured to control the electric motor,
wherein the controller includes a malfunction detector configured to detect a presence or absence of a malfunction of the converter in a mode that differs depending on a temperature state of the steering system, based on the rotation angle of the electric motor from the zero point position obtained by the motor rotation angle obtainer and the movement-amount-related amount obtained by the movement-amount-related-amount obtainer.

2. The steering system according to claim 1, wherein the malfunction detector is configured to detect the presence or absence of the malfunction of the converter in a mode that differs between a stable state in which the temperature state of the steering system is stable and an unstable state in which the temperature state of the steering system is unstable.

3. The steering system according to claim 1,
wherein the controller includes a time counter, and
wherein the malfunction detector estimates that the temperature state of the steering system is the stable state and detects the presence or absence of the malfunction of the converter when a time that elapses after a main switch of the vehicle on which the steering system is installed is switched from OFF to ON is shorter than a first set time and a time during which the main switch is OFF is longer than a second set time that is longer than the first set time.

4. The steering system according to claim 1, further comprising an outside temperature sensor configured to detect an outside temperature and a system temperature sensor configured to detect a temperature of the steering system,
wherein the malfunction detector estimates that the temperature state of the steering system is the stable state and detects the presence or absence of the malfunction of the converter when an absolute value of a difference between a detection value by the outside temperature sensor and a detection value by the system temperature sensor is smaller than a set value.

5. The steering system according to claim 1, wherein the malfunction detector detects the presence or absence of the malfunction of the converter when a speed of the movement of the steering shaft is lower than a set movement speed.

6. The steering system according to claim 1,
wherein the movement-amount-related-amount obtainer includes a rotation angle estimator configured to estimate the rotation angle of the electric motor from the zero point position based on the amount of the movement of the steering shaft from the neutral position,
wherein the malfunction detector is configured to correct, based on the temperature state of the steering system, an absolute value of a difference between the rotation angle of the electric motor from the zero point position estimated by the rotation angle estimator and the rotation angle of the electric motor from the zero point position obtained by the motor rotation angle obtainer, and
wherein the malfunction detector detects that the converter is suffering from the malfunction when a value, which is obtained by correcting the absolute value of the difference based on temperature state of the steering system, is greater than a malfunction determination threshold.

7. The steering system according to claim 6,
wherein the steering shaft is held by a housing so as to be movable in an axial direction thereof relative to the housing, and
wherein the rotation angle estimator includes a pinion that is held by the housing and that is threadedly engaged with a thread portion provided on the steering shaft and a pinion rotation angle obtainer configured to obtain a rotation angle of the pinion from a zero point position thereof.

8. The steering system according to claim 1,
wherein the movement-amount-related-amount obtainer includes a rotation angle estimator configured to estimate the rotation angle of the electric motor from the zero point position based on the amount of the movement of the steering shaft from the neutral position,
wherein the malfunction detector detects that the converter is suffering from the malfunction when a value, which is obtained by subtracting a correction value from an absolute value of a difference between the rotation angle of the electric motor from the zero point position estimated by the rotation angle estimator and the rotation angle of the electric motor from the zero point position obtained by the motor rotation angle obtainer, is greater than a malfunction determination threshold, and
wherein the correction value is made smaller when the temperature state of the system is a stable state than when the temperature state of the steering system is an unstable state.

9. The steering system according to claim 8,
wherein the converter includes a rotation transmitter configured to transmit the rotational motion of the electric motor to a nut member fitted to the steering shaft and a motion converting mechanism configured to convert a rotational motion of the nut member into a linear movement of the steering shaft, and
wherein the rotation transmitter includes a small-diameter pulley fitted to an output shaft of the electric motor so as to be rotatable integrally with the output shat, a large-diameter pulley fitted to the nut member so as to be rotatable integrally with the nut member, and a toothed belt looped over the small-diameter pulley and the large-diameter pulley.

10. The steering system according to claim 9,
wherein the steering shaft is held by a housing so as to be movable in an axial direction thereof relative to the housing,
wherein the rotation angle estimator includes a pinion that is held by the housing and that is threadedly engaged with a thread portion provided on the steering shaft and a pinion rotation angle obtainer configured to obtain a rotation angle of the pinion from a zero point position thereof,
wherein the malfunction detector is configured to obtain, as a tooth jumping count of at least one of the small-diameter pulley and the large-diameter pulley with respect to the toothed belt, an absolute value of a difference between the rotation angle of the pinion from the zero point position obtained by the pinion rotation angle obtainer and the rotation angle of the electric motor from the zero point position obtained by the motor rotation angle obtainer, and
wherein the malfunction detector detects that the converter is suffering from the malfunction when a value obtained by subtracting the correction value from the tooth jumping count is greater than the malfunction determination threshold.

* * * * *